United States Patent [19]

Schacht

[11] Patent Number: 4,642,733

[45] Date of Patent: Feb. 10, 1987

[54] LOADCENTER "PLUG-IN" SURGE PROTECTOR

[76] Inventor: Ezra L. Schacht, 1620 W. Main St., Houston, Tex. 77006

[21] Appl. No.: 727,291

[22] Filed: Apr. 25, 1985

[51] Int. Cl.$^4$ .............................................. H02H 9/00
[52] U.S. Cl. .................................. 361/363; 361/118; 361/361
[58] Field of Search ......................... 361/346, 353–355, 361/356, 358, 359, 361, 363, 376, 118, 117

[56] References Cited

U.S. PATENT DOCUMENTS

| | | | |
|---|---|---|---|
| 4,142,225 | 2/1979 | Diersing | 361/358 |
| 4,327,396 | 4/1982 | Schacht | 361/363 |
| 4,517,623 | 5/1985 | Barner | 361/358 |
| 4,541,030 | 9/1985 | Biegelmeier | 361/56 |

FOREIGN PATENT DOCUMENTS 2853697 6/1979 Fed. Rep. of Germany ........ 361/56

*Primary Examiner*—G. P. Tolin

[57] ABSTRACT

Surge protector components are enclosed within a housing similar in size and shape to that of a "plug-in" circuit breaker. The surge protector enclosure is provided with "stabs" for plugging in to the loadcenter bus, thus connecting the protector line contact solidly to the service conductors. The breaker enclosure is large enough to provide for generously sized surge-protecting components, and the outside case is usually made of phenolic, which can confine the energy of even relatively large surges. Furthermore, the loadside terminal will accept a good sized wire, such as #10 or even #8, which can solidly ground the protective element to the system grounding bus. In most small systems, the loadcenter acts as service equipment, and contains the ground/neutral bus. Instead of the unnecessary breaker handle, there may be a holder for a renewable fuse to limit the follow current after a heavy strike and even a neon lamp to indicate that the surge protective element has been made inoperative by lightning. Replacing the protector is as easy as replacing a breaker. Manufacturers' distributors will presumably stock the surge protectors as they now stock replacement breakers.

3 Claims, 2 Drawing Figures

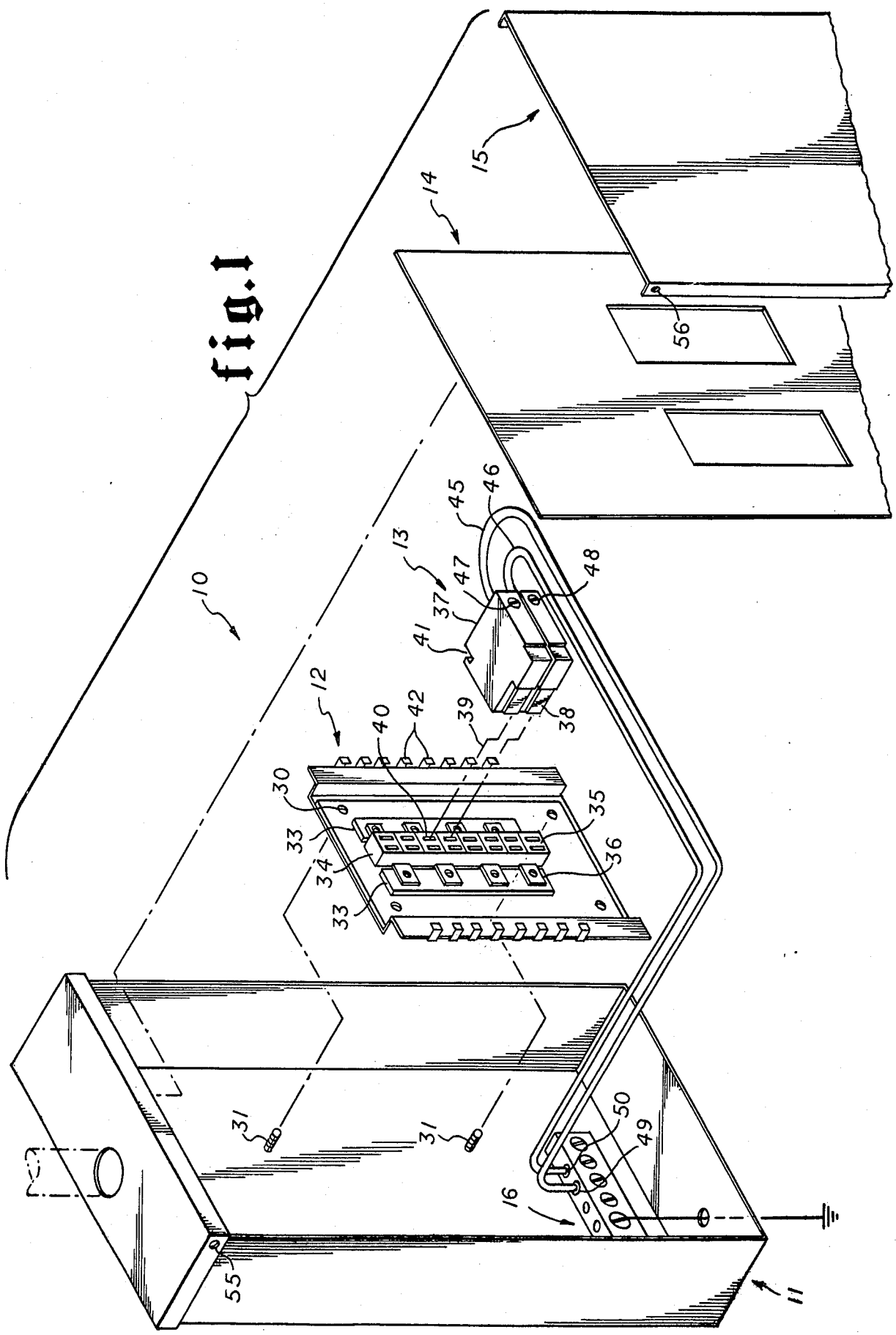

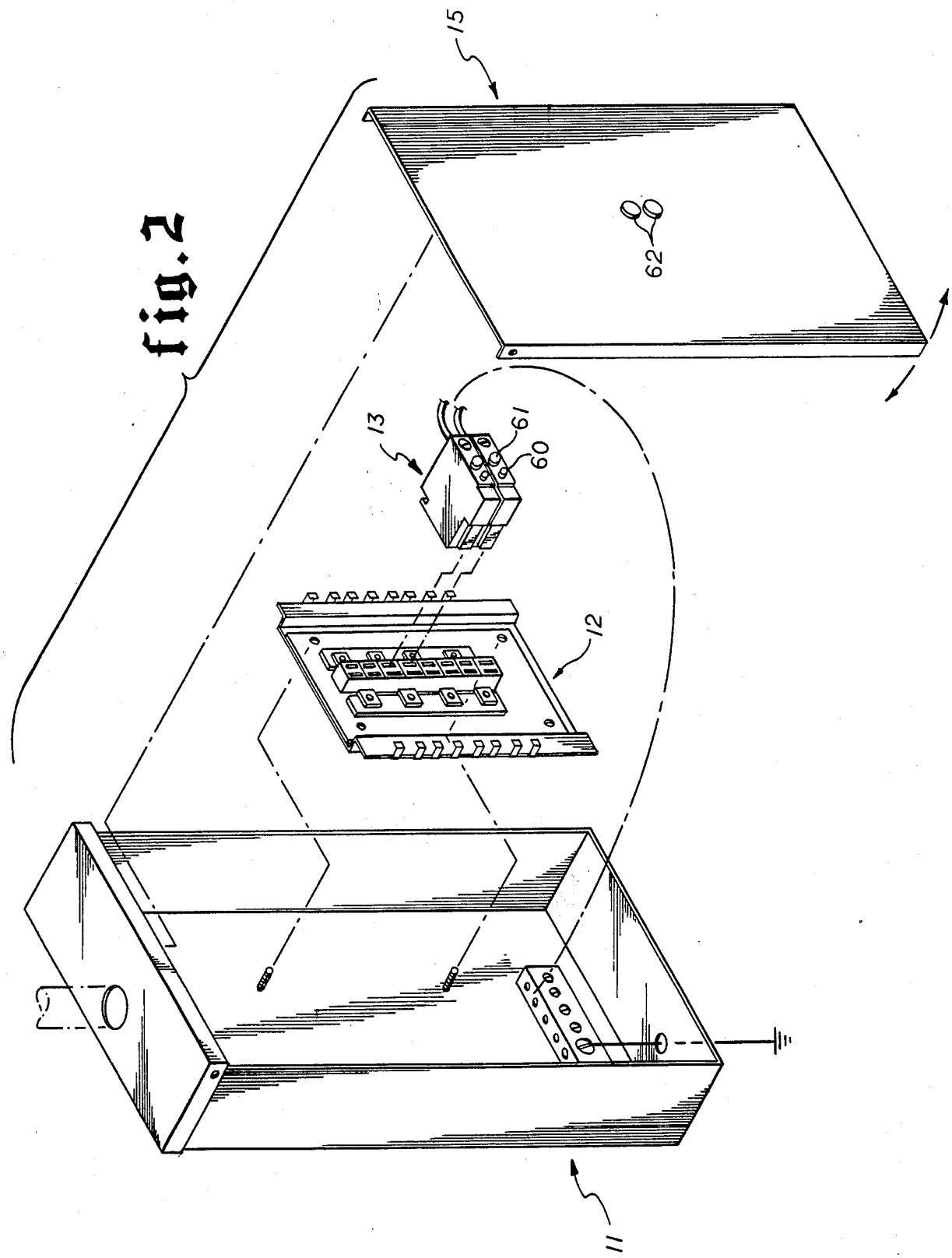

LOADCENTER "PLUG-IN" SURGE PROTECTOR

BACKGROUND OF THE INVENTION

The increasing use of home and small business computers makes it imperative to reduce the effects of surfges, from whatever cause, on their electrical supply lines. A conventional location for a lightning arrestor/surge protector is at the point of service--where the utility service drop wires connect to the customer's service entrance conductors. This point, at the service head, usually about ten feet from grade, is not readily accessible for installation or maintenance of such protective devices, although the instant invention provides one embodiment suitable for such locations.

A location almost as satisfactory is the loadcenter which serves as service equipment, and is usually only a few feet from the service head. The loadcenter contains the circuit breakers, including the main breaker if one is used.

The instant invention incorporates a surge protector within an enclosure similar in size and shape to a molded-case "plug-in" type circuit breaker. This procedure may be used with circuit breakers and loadcenters of virtually any American manufacturer.

It is not the intent of this application to disclose a novel surge protector, but rather an enclosure and mounting means for a protector best suited for the specific requirements of the loads connected to the loadcenter.

Aside from the ease of installation and removal of the device, the solid contacts at the line and ground terminations help to dissipate any heat of operation. The grounding conductor, deliberately oversized to reduce impedance to the flow of the surge current also helps to dissipate surge-induced heat. The large volume and crosssectional area of non-linear resistive material that may be enclosed within a case of, say, 3 inches×4 inches×½ inch in thickness and contact supporting structure, is substantial, when contrasted with the one-inch diameter varistor devices frequently employed for thsi application. Within the case is space for a failure-indicating device, as well as for a fuse to limit the follow- current, in the event of a lightning stroke.

OBJECTS OF SUMMARY OF A PREFERRED EMBODIMENT OF THE INVENTION

Accordingly, it is a primary object of the present invention to provide a novel surge protector, mounted at a readily accessible location, within the load center, close to the point of service to the building.

It is a further object to make the connections of the "plug-in" type, similar to the breakers within the loadcenter, and to secure the "heel" of the surge protector housing with the same type of mounting pan "fingers" as the breaker housings.

It is a further objective to simplify and improve the ground connection required by the surge protector.

It is a further object to provide housings for surge protectors, the housings mountable within the loadcenter, and having adequate space for various combinations of surge protective elements, to match more closely the requirements of the electrical loads connected to the loadcenter.

It is a more specific objective to provide surge protection tailored to the requirements of the computer and electronic loads conected to the load center.

Other objects, dvantages, and features of the present inention will become readily apparent to those skilled in the art upon consideration of the following detailed description and with refrence to the following drawings, wherein like elements have been identified with like numerals, in which:

BRIEF DESCRIPTION OF THE DRAWINGS

FIG. 1 is an exploded pictorial view of a conventional loadcenter, showing, in combination, the enclosure, in this case raintight, the interior mounting pan, a surge protector in a breaker-like case, a deadfront and a front cover for the enclosure.

FIG. 2 is another exploded pictorial view in which the Surge Protector is equipped with a failure-indicator lamp and a renewable follow-current limiting fuse, and the cover may be equipped with a light-transmitting element in axial alignment with the warning lamp.

DESCRIPTION OF PREFERRED EMBODIMENTS OF THE PRESENT INVENTION

With reference now to FIG. 1, there may be seen an apparatus 10, in combination, of the present invention. An enclosure 11 serves as a housing for the pan 12, upon which is mounted in novel fashion, the surge protector 13, along with the conventional circuit breakers (not shown). The apertures 30 in mounting pan 12 engage with studs 31, securing the pan within enclosure 11 in conventional fashion. The neutral/system grounding bus is also fastened within enclosure 11.

Insulatively mounted on pan 12 are the phase buses 33 and the molded insulated block 34 which supports the "stab-receptors" 35 in the proper position. The tails of these "stab-receptors" 36 connect mechanically and electrically to their respective buses.

The surge protector 13 is shown as a two pole device—that is, it can dissipate surges on either line bus. In appearance, its case 37 is similar to that of a circuit breaker of this manufacturer. Seating of the surge protector 13 on mounting pan 12 is accomplished by engaging notch 41 with pan fingers 42. Its line "stabs" 38 engage with "stab-receptors" 40, as indicated by lines 39.

Surge protector 13 is now mechanically secured to the pan 12, and electrically firmly connected to the buses. Now conductors 45 and 46 are connected to surge protector 13 at set screws 47 and 48. And here any similarity to conventional wiring ceases, for the conductors 45 and 46 are connected directly to ground bus 16, say at receptor holes 49 and 50. The lengths of conductors 45 and 46 are exaggerated in length for clarity in the drawing. In actuality, the surge protector terminals have been solidly grounded, with as short a length and with as reasonably large a conductor cross section as practicable.

Surge protector 13 may be as easily removed as installed, by "unplugging" the protector. Of course bare parts of all live equipment within the enclosure 11 are shielded from unauthorized and unqualified persons by the deadfront 14, which engages with the tops of all breakers and the surge protector 13. Front cover 15 engages with enclosure 11 by passing bolts through pairs of holes 55 and 56.

In FIG. 2 may be seen some alternate embodiments of the present invention. Surge protector 13 may be provided with internal failure-indicating lamps 60 and renewable follow-current limiting fuses 61. These improvements can, if preferred, occupy the space normally provided for the manual operating levers in the conventional plug-in breakers.

It is also possible to perforate the cover 15, in alignment with the failure-indicating lamps 60, and in the perforations install light-transmitting elements 62, in order that it not be necessary to open the cover 15 to monitor the condition of the surge protectors.

SUMMARY OF ADVANTAGES AND SCOPE OF THE INVENTION

Thus, it may be seen, that in the practice of the present invention certain distinct advantages may be relaized. An excellent weather-resistant mounting location for the surge protector is utilized. It may be readily grounded to the most effective grounding electrode of the entire wiring system. It can be easily removed, replaced—if defective or if a protector with other characteristics is preferable—and, if there is a main breaker, the jbo can be done in complete safety with all circuits de-energized.

The generous volume within the breaker (surge protector) case provides for rugged protective elements, ones which can provide years of protection against all but catastrophic lightning strokes. The provisions for monitoring the condition of the surge protector are unique and the follow-current limiting fuse is a useful means to prevent further damage should the surge protector fail, and an arc be maintained.

It, therefore, may be seen that the present invention is well adapted to attain substantially all of the objects and advantages hereinabove setforth together with other advantages which will become apparent from the description of the apparatus. This description, including the alternative embodiments, are intended as illustrative of the concept of the present inention, and it is intended that the other embodiments be considered as falling within the spirit and scope of the present invention.

What is claimed is:

1. A surge-protection device for electrical wiring systems including "plug-in" breakers within a loadcenter enclosure, the loadcenter enclosure containing within it:
   (i) a plurality of branch circuit breakers with operating levers;
   (ii) an interior mounting pan on which said breakers are mounted;
   (iii) a plurality of buses, the buses insulatively mounted upon the interior mounting pan, said breakers electrically connected to the buses;
   (iv) mounting pan supporting means;
   (v) a dead-front panel, having apertures aligned with the operating levers of said breakers and means securing the dead-front panel to the enclosure;
   (vi) a front cover over said dead-front panel;
   (vii) a system neutral and grounding bus in said enclosure;
   the surge protection device comprising, in combination:
   (a) a housing containing a surge protector mounted in said enclosure, said housing having a top, a bottom, a front, a rear, and two sides, said housing being substantially similar to enclosures of said breakers, having connection means connected to said buses, having retention means attached to said mounting pan, and having load side terminals;
   (b) means for promptly dissipating energy of said electrical surge with minimal damage to said surge protective device and electrical equipment to be protected, said dissipating means being connected between said busses and said load terminal of said surge protecting device, said load terminal having connection means connected to said neutral and grounding bus through adequate current carrying means; and
   said surge protector housing having means in engagement with said dead front.

2. A surge protector as recited in claim 1, said surge protector feeding no circuit, and having no rated-current breaker-like tripping device, said surge protector having lineside means for connection to said bussing, and said surge protector having loadside means solely for connection to said grounding bus within said loadcenter.

3. A surge protector as recited in claim 1, in which said connection means for connecting said surge protector to said buses, and said retention meansfor securing said surge protector to said mounting pan, are adaptable for connection to said busses and said retention means of said mounting pans of more than one loadcenter manufacturer.

* * * * *